United States Patent
Huang (10) Patent No.: US 10,962,739 B2
(45) Date of Patent: Mar. 30, 2021

(54) CAMERA LENS ASSEMBLY

(71) Applicant: Zhejiang Sunny Optical Co., Ltd, Zhejiang (CN)

(72) Inventor: Lin Huang, Zhejiang (CN)

(73) Assignee: ZHEJIANG SUNNY OPTICAL CO., LTD, Ningbo (CN)

(*) Notice: Subject to any disclaimer, the term of this patent is extended or adjusted under 35 U.S.C. 154(b) by 154 days.

(21) Appl. No.: 16/212,008

(22) Filed: Dec. 6, 2018

(65) Prior Publication Data
US 2019/0113712 A1    Apr. 18, 2019

Related U.S. Application Data (63) Continuation of application No. PCT/CN2018/077206, filed on Feb. 26, 2018.

(30) Foreign Application Priority Data

Jul. 18, 2017  (CN) .......................... 201710585219.6
Jul. 18, 2017  (CN) .......................... 201720870774.9

(51) Int. Cl.
| | |
|---|---|
| *G02B 9/34* | (2006.01) |
| *G02B 13/18* | (2006.01) |
| *G02B 13/00* | (2006.01) |
| *G02B 13/04* | (2006.01) |
| *G02B 5/20* | (2006.01) |
| *G02B 5/00* | (2006.01) |

(52) U.S. Cl.
CPC ............. *G02B 13/004* (2013.01); *G02B 9/34* (2013.01); *G02B 13/04* (2013.01); *G02B 5/005* (2013.01); *G02B 5/20* (2013.01)

(58) Field of Classification Search
CPC ........ G02B 13/004; G02B 9/34; G02B 13/04; G02B 5/005; G02B 5/20
USPC ................ 359/715, 753, 771, 772, 779, 780
See application file for complete search history.

(56) References Cited

U.S. PATENT DOCUMENTS

| | | | |
|---|---|---|---|
| 2012/0105704 A1 | 5/2012 | Huang et al. | |
| 2014/0009249 A1 | 1/2014 | Park | |
| 2017/0363841 A1* | 12/2017 | Chen ....................... | G02B 9/62 |

FOREIGN PATENT DOCUMENTS

| | | |
|---|---|---|
| CN | 101782676 | 7/2010 |
| CN | 103713380 A | 4/2014 |
| CN | 107092077 | 8/2017 |
| CN | 107144943 | 9/2017 |
| CN | 206930825 | 1/2018 |
| CN | 206990889 | 2/2018 |

\* cited by examiner

*Primary Examiner* — William Choi
(74) *Attorney, Agent, or Firm* — Hauptman Ham, LLP (57) ABSTRACT

The present disclosure discloses a camera lens assembly includes, sequentially along an optical axis from an object side to an image side, a first lens, a second lens, a third lens and a fourth lens, the lenses having refractive powers. At least one of the first lens or the second lens has a positive refractive power. An object-side surface of the third lens and an image-side surface of the fourth lens are both concave surfaces. Half of a diagonal length ImgH of an effective pixel area on an image plane of the camera lens assembly and a total effective focal length f of the camera lens assembly satisfy: ImgH/f>1.

19 Claims, 4 Drawing Sheets

CAMERA LENS ASSEMBLY

CROSS-REFERENCE TO RELATED APPLICATIONS

This application is a continuation of International Application No. PCT/CN2018/077206, filed on Feb. 26, 2018, which claims priorities and rights to Chinese Patent Application No. 201710585219.6, filed with the China National Intellectual Property Administration (CNIPA) on Jul. 18, 2017, and Chinese Patent Application No. 201720870774.9 filed with the CNIPA on Jul. 18, 2017. All of the aforementioned applications are hereby incorporated by reference in their entireties.

TECHNICAL FIELD

The present disclosure relates to a camera lens assembly, and more specifically, relates to a wide-angle camera lens assembly including four lenses.

BACKGROUND

With the development of chip technologies such as CCD or CMOS, camera lens assemblies have gradually developed toward the fields of miniaturization, light weight, and high pixel. In some application fields, corresponding requirements on the large field-of-view of lens assemblies have also been put forward, and the lens assemblies need to have a wide-angle characteristic while satisfying miniaturization and high imaging quality. In addition, in order to realize stable mass production, the lens assemblies also need to have a good sensitivity.

In order to realize the wide-angle characteristic, the field-of-view of a lens assembly is generally enlarged by increasing the number of lenses, but this approach is not conducive to realizing miniaturization and light weight of the lens assembly; at the same time, the excessive number of lenses also limits the reduction of various aberrations, which is not conducive to improving the imaging quality of the lens assembly.

Therefore, it is necessary to provide a wide-angle camera lens assembly having a compact structure, high image quality and low sensibility without excessively increasing the number of lenses of the lens assembly.

SUMMARY

The present disclosure provides a camera lens assembly that may be applied to portable electronic products and may at least solve or partially solve at least one of the above mentioned disadvantages in the existing technology, such as a wide-angle lens assembly.

According to one aspect, the present disclosure provides a camera lens assembly. The camera lens assembly includes, sequentially along an optical axis from an object side to an image side, a first lens, a second lens, a third lens and a fourth lens, the lenses having refractive powers. At least one of the first lens or the second lens may have a positive refractive power. An object-side surface of the third lens and an image-side surface of the fourth lens may both be concave surfaces. Half of a diagonal length ImgH of an effective pixel area on an image plane of the camera lens assembly and a total effective focal length f of the camera lens assembly may satisfy: ImgH/f>1.

In an implementation, the first lens and the second lens may both have positive refractive powers. An effective focal length f1 of the first lens and an effective focal length f2 of the second lens may satisfy: $3<f1/f2\leq7$.

In an implementation, a radius of curvature R5 of the object-side surface of the third lens and a radius of curvature R6 of an image-side surface of the third lens may satisfy: $0.7<R5/R6<1.2$.

In an implementation, the camera lens assembly may further includes a diaphragm disposed between the first lens and the second lens.

In an implementation, an object-side surface of the first lens may be a convex surface, and an image-side surface of the second lens may be a convex surface.

In an implementation, a center thickness CT2 of the second lens on the optical axis and a distance TTL from a center of the object-side surface of the first lens to the image plane of the camera lens assembly on the optical axis may satisfy: $0.1<CT2/TTL<0.22$.

In an implementation, a spacing distance T12 between the first lens and the second lens on the optical axis and the distance TTL from the center of the object-side surface of the first lens to the image plane of the camera lens assembly on the optical axis may satisfy: $0.8<(T12*10)/TTL<1.5$.

In an implementation, an edge thickness ET4 of the fourth lens and a center thickness CT4 of the fourth lens on the optical axis may satisfy: $1<ET4/CT4<1.5$.

In an implementation, an effective radius DT12 of an image-side surface of the first lens and an effective radius DT22 of the image-side surface of the second lens may satisfy: $0.7<DT12/DT22<1.3$.

In an implementation, an effective radius DT11 of the object-side surface of the first lens and an effective radius DT32 of the image-side surface of the third lens may satisfy: $0.9<DT11/DT32<1.3$.

In an implementation, a distance SAG42 from an intersection point of the image-side surface of the fourth lens and the optical axis to a vertex of an effective radius of the image-side surface of the fourth lens on the optical axis and the center thickness CT4 of the fourth lens on the optical axis may satisfy: $0.2<SAG42/CT4<0.6$.

In an implementation, the camera lens assembly may further includes a band-pass optical filter disposed between the fourth lens and the image plane of the camera lens assembly, and a passband of the band-pass optical filter may be from 400 nm to 800 nm.

According to another aspect, the present disclosure provides a camera lens assembly. The camera lens assembly includes, sequentially along an optical axis from an object side to an image side, a first lens, a second lens, a third lens and a fourth lens. Both the first lens and the second lens may have a positive refractive power. The third lens may have a positive refractive power or a negative refractive power, and an object-side surface of the third lens may be a concave surface. The fourth lens may have a positive refractive power or a negative refractive power, and an image-side surface of the fourth lens may be a concave surface. An edge thickness ET4 of the fourth lens and a center thickness CT4 of the fourth lens on the optical axis may satisfy: $1<ET4/CT4<1.5$.

In an implementation, an object-side surface of the first lens may be a convex surface, and an image-side surface of the second lens may be a convex surface. The camera lens assembly may further include a diaphragm disposed between the first lens and the second lens.

In an implementation, an effective focal length f1 of the first lens and an effective focal length f2 of the second lens may satisfy: $3<f1/f2\leq7$.

In an implementation, a radius of curvature R5 of the object-side surface of the third lens and a radius of curvature R6 of an image-side surface of the third lens may satisfy: $0.7<R5/R6<1.2$.

In an implementation, a center thickness CT2 of the second lens on the optical axis and a distance TTL from a center of the object-side surface of the first lens to an image plane of the camera lens assembly on the optical axis may satisfy: $0.1<CT2/TTL<0.22$.

In an implementation, the camera lens assembly may further include a band-pass optical filter disposed between the fourth lens and the image plane of the camera lens assembly.

In an implementation, the passband of the band-pass optical filter may be from 400 nm to 800 nm.

In an implementation, half of a diagonal length ImgH of an effective pixel area on the image plane of the camera lens assembly and a total effective focal length f of the camera lens assembly may satisfy: $ImgH/f>1$.

In an implementation, a spacing distance T12 between the first lens and the second lens on the optical axis and the distance TTL from the center of the object-side surface of the first lens to the image plane of the camera lens assembly on the optical axis may satisfy: $0.8<(T12*10)/TTL<1.5$.

In an implementation, an effective radius DT12 of an image-side surface of the first lens and an effective radius DT22 of the image-side surface of the second lens may satisfy: $0.7<DT12/DT22<1.3$.

In an implementation, an effective radius DT11 of the object-side surface of the first lens and an effective radius DT32 of the image-side surface of the third lens may satisfy: $0.9<DT11/DT32<1.3$.

In an implementation, a distance SAG42 from an intersection point of the image-side surface of the fourth lens and the optical axis to a vertex of an effective radius of the image-side surface of the fourth lens on the optical axis and the center thickness CT4 of the fourth lens on the optical axis may satisfy: $0.2<SAG42/CT4<0.6$.

According to another aspect, the present disclosure provides a camera lens assembly. The camera lens assembly includes, sequentially along an optical axis from an object side to an image side, a first lens, a second lens, a third lens and a fourth lens. Both the first lens and the second lens may have a positive refractive power. The third lens may have a positive refractive power or a negative refractive power, and an object-side surface of the third lens may be a concave surface. The fourth lens may have a positive refractive power or a negative refractive power, and an image-side surface of the fourth lens may be a concave surface. An effective radius DT12 of an image-side surface of the first lens and an effective radius DT22 of an image-side surface of the second lens may satisfy: $0.7<DT12/DT22<1.3$.

According to another aspect, the present disclosure provides a camera lens assembly. The camera lens assembly includes, sequentially along an optical axis from an object side to an image side, a first lens, a second lens, a third lens and a fourth lens. Both the first lens and the second lens may have a positive refractive power. The third lens may have a positive refractive power or a negative refractive power, and an object-side surface of the third lens may be a concave surface. The fourth lens may have a positive refractive power or a negative refractive power, and an image-side surface of the fourth lens may be a concave surface. An effective radius DT11 of an object-side surface of the first lens and an effective radius DT32 of an image-side surface of the third lens may satisfy: $0.9<DT11/DT32<1.3$.

According to another aspect, the present disclosure provides a camera lens assembly. The camera lens assembly includes, sequentially along an optical axis from an object side to an image side, a first lens, a second lens, a third lens and a fourth lens. Both the first lens and the second lens may have a positive refractive power. The third lens may have a positive refractive power or a negative refractive power, and an object-side surface of the third lens may be a concave surface. The fourth lens may have a positive refractive power or a negative refractive power, and an image-side surface of the fourth lens may be a concave surface. A distance SAG42 from an intersection point of the image-side surface of the fourth lens and the optical axis to a vertex of an effective radius of the image-side surface of the fourth lens on the optical axis and a center thickness CT4 of the fourth lens on the optical axis may satisfy: $0.2<SAG42/CT4<0.6$.

According to another aspect, the present disclosure provides a camera lens assembly. The camera lens assembly includes, sequentially along an optical axis from an object side to an image side, a first lens, a second lens, a third lens and a fourth lens. Both the first lens and the second lens may have a positive refractive power. The third lens may have a positive refractive power or a negative refractive power, and an object-side surface of the third lens may be a concave surface. The fourth lens may have a positive refractive power or a negative refractive power, and an image-side surface of the fourth lens may be a concave surface. The camera lens assembly may further include a band-pass optical filter disposed between the fourth lens and an image plane of the camera lens assembly. The passband of the band-pass optical filter may be from 400 nm to 800 nm.

In the present disclosure, multiple lenses (e.g., four lenses) are used. By reasonably distributing the refractive powers, surface types of the lenses, center thicknesses of the lenses, and air spacing on the optical axis between the lenses, the camera lens assembly may have at least one of the following advantages:

enlarging the field-of-view, and realizing wide-angle of the lens assembly;

a compact structure, realizing miniaturization of the lens assembly;

reducing sensitivity of the lens assembly; and correcting various aberrations, and improving an imaging quality of the lens assembly.

BRIEF DESCRIPTION OF THE DRAWINGS

By describing non-limiting implementations below in detail with reference to the accompanying drawings, other features, objectives and advantages of the present disclosure will be more apparent. In the accompanying drawings.

DETAILED DESCRIPTION OF EMBODIMENTS

For a better understanding of the present disclosure, various aspects of the present disclosure will be described in more detail with reference to the accompanying drawings. It should be understood that the detailed description is merely illustrative of exemplary implementations of the present disclosure and is not intended to limit the scope of the present disclosure in any way. Throughout the specification, the same reference numerals refer to the same elements. The expression "and/or" includes any and all combinations of one or more of the associated listed items.

It should be noted that in the present specification, the expressions such as the first, the second, the third are used only to distinguish one feature from another, without indicating any limitation to the feature. Thus, the first lens discussed below may also be referred to as the second lens or the third lens without departing from the teachings of the present disclosure.

In the accompanying drawings, the thickness, size and shape of the lens have been slightly exaggerated for the convenience of explanation. Specifically, shapes of spherical surfaces or aspheric surfaces shown in the accompanying drawings are shown by way of examples. That is, shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

In the present disclosure, the paraxial area refers to an area near the optical axis. If a lens surface is a convex surface and the position of the convex surface is not defined, it indicates that the lens surface is a convex surface at least at the paraxial area. If the lens surface is a concave surface and the position of the concave surface is not defined, it indicates that the lens surface is a concave surface at least at the paraxial area. A surface closest to an object in each lens is referred to as an object-side surface, and a surface closest to an image plane in each lens is referred to as an image-side surface.

It should be further understood that the terms "comprising," "including," "having" and variants thereof, when used in this specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." In addition, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the related art and will not be interpreted in an idealized or overly formal sense unless expressly so defined herein.

It should be noted that the embodiments in the present disclosure and the features in the embodiments may be combined with each other on a non-conflict basis. The present disclosure will be described below in detail with reference to the accompanying drawings and in combination with the embodiments.

Characteristics, principles and other aspects of the present disclosure will be described below in detail.

The camera lens assembly according to the exemplary implementations of the present disclosure has, for example, four lenses having refractive powers, i.e., a first lens, a second lens, a third lens and a fourth lens. These four lenses are arranged in sequence along an optical axis from an object side to an image side. The camera lens assembly may further include a photosensitive element disposed on the image plane.

In the exemplary implementations, the first lens may have a positive refractive power. The second lens may have a positive refractive power. The third lens may have a positive refractive power or a negative refractive power, and an object-side surface of the third lens may be a concave surface. The fourth lens may have a positive refractive power or a negative refractive power, and an image-side surface of the fourth lens may be a concave surface.

The camera lens assembly may further include a diaphragm disposed between the first lens and the second lens to further improve the imaging quality of the lens assembly. Alternatively, an object-side surface of the first lens may be a convex surface, and an image-side surface of the first lens may be a concave surface. An object-side surface of the second lens may be a concave surface, and an image-side surface of the second lens may be a convex surface. With such an arrangement, the first lens and the second lens form an approximately symmetrical structure centering on the diaphragm, so that sensitivity of the lens assembly can be effectively reduced.

An effective focal length f1 of the first lens and an effective focal length f2 of the second lens may satisfy: $3<f1/f2\leq7$, more specifically, f1 and f2 may further satisfy: $5.66\leq f1/f2\leq7.00$. The ratio of f1 to f2 is controlled within a reasonable range, which may effectively avoid excessive concentration of the refractive powers, reduce the sensitivity of the lens assembly, and improve the imaging quality of the lens assembly.

A radius of curvature R5 of the object-side surface of the third lens and a radius of curvature R6 of an image-side surface of the third lens may satisfy: $0.7<R5/R6<1.2$, more specifically, R5 and R6 may further satisfy: $0.72\leq R5/R6\leq1.14$ to reduce the sensitivity of the lens assembly and improve quality of the lens assembly.

A center thickness CT2 of the second lens on the optical axis and a total track length TTL of the camera lens assembly (i.e., a distance on the optical axis from a center of the object-side surface of the first lens to the image plane of the camera lens assembly) may satisfy: $0.1<CT2/TTL<0.22$, more specifically, CT2 and TTL may further satisfy: $0.14\leq CT2/TTL\leq0.21$. Reasonably configuring CT2 and TTL helps to shorten the total track length of the lens assembly and realize miniaturization and wide-angle.

A spacing distance T12 on the optical axis between the first lens and the second lens and the total track length TTL of the camera lens assembly may satisfy: $0.8<(T12*10)/$ TTL<1.5, more specifically, T12 and TTL may further satisfy: $0.81 \leq (T12*10)/TTL \leq 1.49$. Reasonably configuring T12 and TTL may make the lens assembly have a more compact structure, and at the same time may reduce the sensitivity of the lens assembly and improve the imaging quality.

An edge thickness ET4 of the fourth lens and a center thickness CT4 of the fourth lens on the optical axis may satisfy: $1 < ET4/CT4 < 1.5$, more specifically, ET4 and CT4 may further satisfy: $1.08 \leq ET4/CT4 \leq 1.36$ to correct a chief ray angle and improve a relative illumination of the lens assembly.

Alternatively, the image-side surface of the fourth lens may have at least one inflection point (i.e., the image-side surface of the fourth lens from center to edge at least has a changing tendency from convex to convex) so that the image-side surface of the fourth lens is a concave surface at the paraxial area, and is a convex surface at the periphery away from the optical axis, thereby effectively reducing the sensitivity. At the same time, such a surface type arrangement can also effectively suppress the angle of off-axis field light incident on the photosensitive element, increase a receiving efficiency of the photosensitive element, and further correct aberrations in the off-axis field-of-view.

An effective radius DT12 of the image-side surface of the first lens and an effective radius DT22 of the image-side surface of the second lens may satisfy: $0.7 < DT12/DT22 < 1.3$, more specifically, DT12 and DT22 may further satisfy: $0.78 \leq DT12/DT22 \leq 1.27$ to realize the effect of wide-angle.

An effective radius DT11 of the object-side surface of the first lens and an effective radius DT32 of the image-side surface of the third lens may satisfy: $0.9 < DT11/DT32 < 1.3$, more specifically, DT11 and DT32 may further satisfy: $1.00 \leq DT11/DT32 \leq 1.20$ to reduce the sensitivity of the lens assembly and improve the imaging quality.

A distance SAG42 on the optical axis from an intersection point of the image-side surface of the fourth lens and the optical axis to a vertex of an effective radius of the image-side surface of the fourth lens and the center thickness CT4 of the fourth lens on the optical axis may satisfy: $0.2 < SAG42/CT4 < 0.6$, more specifically, SAG42 and CT4 may further satisfy: $0.29 \leq SAG42/CT4 \leq 0.58$. Reasonably configuring SAG42 and CT4 may effectively reduce the sensitivity of the lens assembly and improve the imaging quality.

Half of a diagonal length ImgH of the effective pixel area of the photosensitive element on the image plane of the camera lens assembly and a total effective focal length f of the camera lens assembly may satisfy: $ImgH/f > 1$, more specifically, ImgH and f may further satisfy: $1.10 \leq ImgH/f \leq 1.13$ to realize imaging of larger object-side space by the photosensitive element.

Alternatively, the camera lens assembly may further include an optical filter disposed between the fourth lens and the image plane. The optical filter may be a band-pass optical filter, and a passband thereof may be from about 400 nm to about 800 nm. The optical filter may be used to filter out unwanted spectral ranges to improve the imaging quality of the lens assembly.

Alternatively, the camera lens assembly may further include a protective glass for protecting the photosensitive element on the image plane.

Alternatively, plastic lenses may be adopted for each lens in the camera lens assembly to meet the requirement of light weight.

The camera lens assembly as described in the preceding text may use, for example, four lenses, which may effectively avoid the problems such as excessive lens volume and excessive weight due to the excessive number of lenses, and is advantageous in achieving miniaturization and light weight of the lens assembly. By reasonably allocating to each lens the refractive power, the surface type, the center thickness, and the axial spacing distance between the lenses, etc., the camera lens assembly according to the above implementations of the present disclosure may enlarge the field-of-view of the lens assembly, shorten the total track length of the lens assembly, and reduce the sensitivity of the lens assembly while ensuring the imaging quality, thereby providing a wide-angle camera lens assembly having a compact structure, high image quality and low sensibility and applicable to portable devices.

In the implementations of the present disclosure, at least one of the surfaces of the lenses is an aspheric surface. The feature of the aspheric lens is: from the center of the lens to the periphery, the curvature is continuously changing. Unlike the spherical lens with a constant curvature from the center of the lens to the periphery, the aspheric lens has a better radius-of-curvature characteristic, having advantages of improving a distortion aberration and improving an astigmatic aberration. By using the aspheric lens, an aberration occurred at the time of imaging can be eliminated as far as possible, thereby improving the imaging quality of the camera lens assembly.

However, it should be understood by those skilled in the art that the various results and advantages described in the present specification may be obtained by changing the number of the lenses constituting the camera lens assembly without departing from the technical solution claimed by the present disclosure. For example, although four lenses are described as an example in the implementations, the camera lens assembly is not limited to including four lenses. If desired, the camera lens assembly may also include other numbers of lenses.

Specific embodiments of the camera lens assembly that may be applied to the above implementations are further described below with reference to the accompanying drawings.

Embodiment 1

Figure 1:
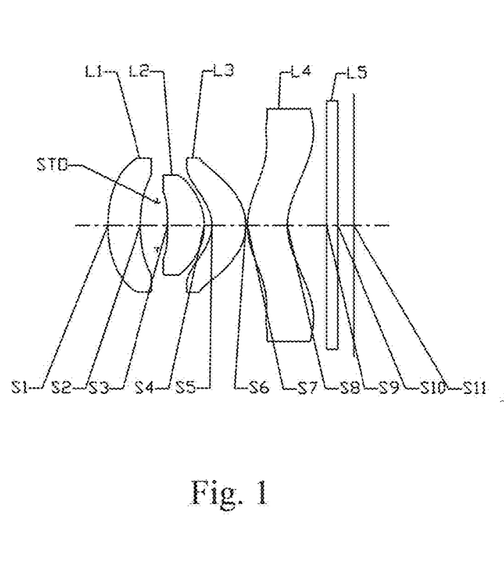
FIG. 1 illustrates a schematic structural diagram of a camera lens assembly according to Embodiment 1 of the present disclosure.

The camera lens assembly according to Embodiment 1 of the present disclosure is described below with reference to FIG. 1 to FIG. 2C. FIG. 1 illustrates a schematic structural diagram of the camera lens assembly according to Embodiment 1 of the present disclosure.

As shown in FIG. 1, the camera lens assembly includes, sequentially along an optical axis from an object side to an image side, a first lens L1, a second lens L2, a third lens L3, a fourth lens L4 and an image plane S11. The camera lens assembly may further include a photosensitive element disposed on the image plane S11.

The first lens L1 has a positive refractive power, an object-side surface S1 of the first lens L1 is a convex surface, and an image-side surface S2 of the first lens L1 is a concave surface. Both the object-side surface S1 and the image-side surface S2 of the first lens L1 are aspheric surfaces.

The second lens L2 has a positive refractive power, an object-side surface S3 of the second lens L2 is a concave surface, and an image-side surface S4 of the second lens L2 is a convex surface. Both the object-side surface S3 and the image-side surface S4 of the second lens L2 are aspheric surfaces.

The third lens L3 has a positive refractive power, an object-side surface S5 of the third lens L3 is a concave surface, and an image-side surface S6 of the third lens L3 is a convex surface. Both the object-side surface S5 and the image-side surface S6 of the third lens L3 are aspheric surfaces.

The fourth lens L4 has a positive refractive power, an object-side surface S7 of the fourth lens L4 is a convex surface, and an image-side surface S8 of the fourth lens L4 is a concave surface. Both the object-side surface S7 and the image-side surface S8 of the fourth lens L4 are aspheric surfaces.

Alternatively, the camera lens assembly may further include an optical filter L5 having an object-side surface S9 and an image-side surface S10. The optical filter L5 may be a band-pass optical filter, and a passband thereof may be from about 400 nm to about 800 nm.

Alternatively, a diaphragm STO for limiting the light beam may be disposed between the first lens L1 and the second lens L2 to improve the imaging quality of the camera lens assembly.

Table 1 shows the surface type, the radius of curvature, the thickness, the material and the conic coefficient of each lens of the camera lens assembly in Embodiment 1. The radius of curvature and the thickness are shown in millimeters (mm).

TABLE 1

| surface number | surface type | radius of curvature | thickness | refractive index | abbe number | conic coefficient |
|---|---|---|---|---|---|---|
| OBJ | spherical | infinite | infinite | | | |
| S1 | aspheric | 2.5160 | 0.6133 | 1.64 | 23.5 | 2.2456 |
| S2 | aspheric | 3.1543 | 0.3155 | | | 5.0000 |
| STO | spherical | infinite | 0.1904 | | | |
| S3 | aspheric | −6.0469 | 0.6850 | 1.55 | 56.1 | −45.1459 |
| S4 | aspheric | −1.0999 | 0.1426 | | | −0.0968 |
| S5 | aspheric | −0.6725 | 0.6325 | 1.55 | 56.1 | −1.4809 |
| S6 | aspheric | −0.8812 | 0.0300 | | | −0.9983 |
| S7 | aspheric | 1.2316 | 0.7442 | 1.55 | 56.1 | −0.6818 |
| S8 | aspheric | 1.1563 | 0.7308 | | | −0.7823 |
| S9 | spherical | infinite | 0.2100 | 1.52 | 64.2 | |
| S10 | spherical | infinite | 0.3000 | | | |
| S11 | spherical | infinite | | | | |

As may be obtained from Table 1, the radius of curvature R5 of the object-side surface S5 of the third lens L3 and the radius of curvature R6 of the image-side surface S6 of the third lens L3 satisfy: R5/R6=0.76.

In the present embodiment, the surface type x of each aspheric surface is defined by the following formula:

$$x = \frac{ch^2}{1 + \sqrt{1-(k+1)c^2h^2}} + \sum A_i h^i \quad (1)$$

Here, x is the distance sagittal height to the vertex of the aspheric surface when the aspheric surface is at a position of a height h along the optical axis; c is the paraxial curvature of the aspheric surface, and c=1/R (i.e., the paraxial curvature c is the reciprocal of the radius of curvature R in Table 1 above); k is the conic coefficient (given in Table 1); and Ai is the correction coefficient of the $i^{th}$ order of the aspheric surface. Table 2 below shows the high-order coefficients $A_4$, $A_6$, $A_8$, $A_{10}$, $A_{12}$, $A_{14}$ and $A_{16}$ applicable to the aspheric mirror surfaces S1-S8 in Embodiment 1.

TABLE 2

| surface number | A4 | A6 | A8 | A10 | A12 | A14 | A16 |
|---|---|---|---|---|---|---|---|
| S1 | 2.9247E−02 | 1.5296E−02 | −2.4691E−02 | 1.9903E−02 | −1.4463E−04 | −5.9714E−03 | 2.2840E−03 |
| S2 | 1.1008E−01 | −1.4043E−01 | 9.9462E−02 | 2.7193E−01 | −7.8784E−01 | 7.8026E−01 | −2.8649E−01 |
| S3 | −2.1330E−01 | −2.3131E−01 | −4.4516E−01 | 3.0224E−01 | 5.0344E−12 | 5.7851E−13 | −5.3988E−13 |
| S4 | −4.8956E−02 | 3.2558E−02 | −3.6404E−01 | 5.8302E−02 | 4.8752E−02 | 1.8133E−09 | 3.0810E−10 |
| S5 | 1.2505E−01 | −1.3994E−01 | 3.2332E−01 | −1.6067E−01 | −1.1485E−03 | 1.9611E−03 | 6.5385E−03 |
| S6 | −3.8901E−02 | 4.7375E−02 | −9.1492E−02 | 5.0488E−02 | 9.3052E−04 | 8.3495E−05 | 6.9163E−05 |
| S7 | −2.0272E−01 | 6.4779E−02 | −2.8490E−02 | 6.9829E−03 | −6.7768E−04 | 1.3197E−05 | −2.2037E−06 |
| S8 | −2.0575E−01 | 8.1546E−02 | −3.5375E−02 | 1.0383E−02 | −1.9585E−03 | 2.0925E−04 | −9.5339E−06 |

Table 3 shows the total effective focal length f of the camera lens assembly, the effective focal lengths f1-f4 of the lenses, the total track length TTL (i.e., the distance on the optical axis from the object-side surface S1 of the first lens L1 to the image plane S11) of the camera lens assembly, the half of the diagonal length ImgH of the effective pixel area of the photosensitive element on the image plane S11 of the camera lens assembly, the half of the maximal field-of-view HFOV of the camera lens assembly and the f-number Fno of the camera lens assembly in Embodiment 1.

TABLE 3

| parameter | f (mm) | f1 (mm) | f2 (mm) | f3 (mm) | f4 (mm) |
|---|---|---|---|---|---|
| value | 2.14 | 14.01 | 2.35 | 73.90 | 13.91 |
| parameter | TTL (mm) | ImgH (mm) | HFOV (°) | Fno | |
| value | 4.59 | 2.42 | 50.23 | 2.25 | |

According to Table 3, the effective focal length f1 of the first lens L1 and the effective focal length f2 of the second lens L2 satisfy: f1/f2=5.97. The half of the diagonal length ImgH of the effective pixel area of the photosensitive element on the image plane S11 of the camera lens assembly and the total effective focal length f of the camera lens assembly satisfy: ImgH/f=1.13. It may be obtained from Table 1 and Table 3 that the center thickness CT2 of the second lens L2 on the optical axis and the total track length TTL of the camera lens assembly satisfy: CT2/TTL=0.15. The spacing distance T12 on the optical axis between the first lens and the second lens and the total track length TTL of the camera lens assembly satisfy: (T12*10)/TTL=1.10.

In Embodiment 1, the edge thickness ET4 of the fourth lens L4 and the center thickness CT4 of the fourth lens L4 on the optical axis satisfy: ET4/CT4=1.09. The effective radius DT12 of the image-side surface S2 of the first lens L1 and the effective radius DT22 of the image-side surface S4 of the second lens L2 satisfy: DT12/DT22=0.99. The effective radius DT11 of the object-side surface S1 of the first lens L1 and the effective radius DT32 of the image-side surface 36 of the third lens L3 satisfy: DT11/DT32=1.00. The distance SAG42 on the optical axis from the intersection point of the image-side surface S8 of the fourth lens L4 and the optical axis to the vertex of the effective radius of the image-side surface S8 of the fourth lens L4 and the center thickness CT4 of the fourth lens L4 on the optical axis satisfy: SAG42/CT4=0.58.

In the present embodiment, the half of the maximal field-of-view HFOV of the camera lens assembly is HFOV=50.23°, having a large field-of-view.

Figure 2A:
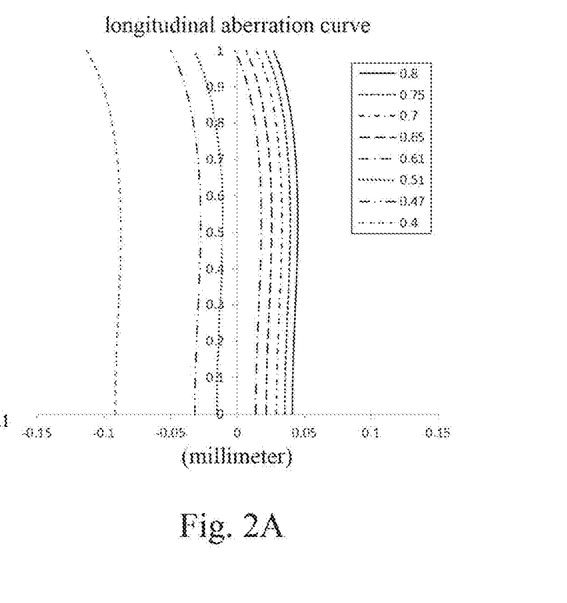
FIGS. 2A-2C respectively illustrate a longitudinal aberration curve, an astigmatic curve and a distortion curve of the camera lens assembly according to Embodiment 1.
Figure 2B:
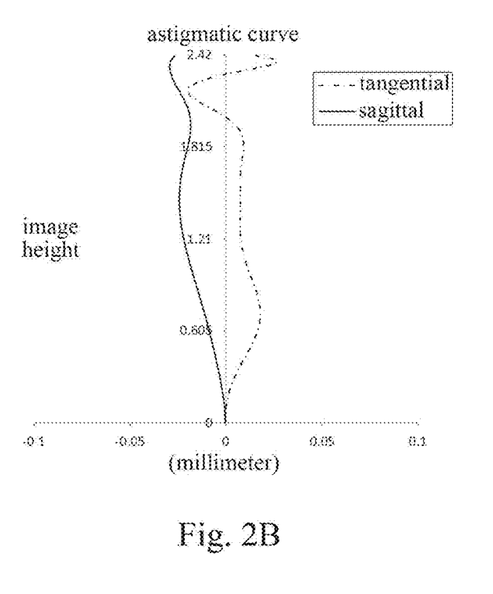
Figure 2C:
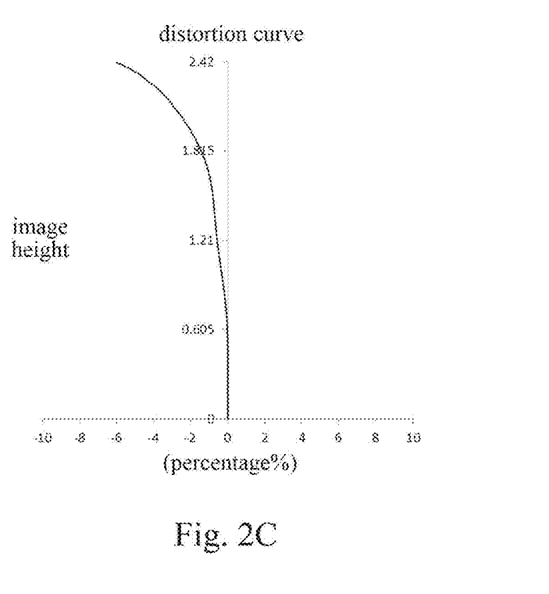

FIG. 2A shows the longitudinal aberration curve of the camera lens assembly according to Embodiment 1, representing deviations of focal points of light of different wavelengths converged after passing through the lens assembly. FIG. 2B shows the astigmatic curve of the camera lens assembly according to Embodiment 1, representing a curvature of the tangential image plane and a curvature of the sagittal image plane. FIG. 2C shows the distortion curve of the camera lens assembly according to Embodiment 1, representing amounts of distortion at different viewing angles. According to FIG. 2A to FIG. 2C, it may be seen that the camera lens assembly according to Embodiment 1 can achieve a good imaging quality.

Embodiment 2

Figure 3:
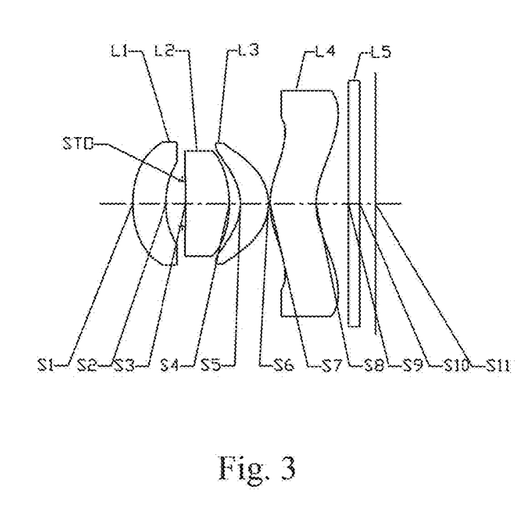
FIG. 3 illustrates a schematic structural diagram of a camera lens assembly according to Embodiment 2 of the present disclosure.

The camera lens assembly according to Embodiment 2 of the present disclosure is described below with reference to FIGS. 3-4C. In the present embodiment and the following embodiments, for the purpose of brevity, the description of parts similar to those in Embodiment 1 will be omitted. FIG. 3 is a schematic structural diagram illustrating the camera lens assembly according to Embodiment 2 of the present disclosure.

As shown in FIG. 3, the camera lens assembly includes a first lens L1, a second lens L2, a third lens L3, a fourth lens L4 and an image plane S11 sequentially along an optical axis from an object side to an image side. The camera lens assembly may further include a photosensitive element disposed on the image plane S11.

The first lens L1 has a positive refractive power, an object-side surface S1 of the first lens L1 is a convex surface, and an image-side surface S2 of the first lens L1 is a concave surface. Both the object-side surface S1 and the image-side surface S2 of the first lens L1 are aspheric surfaces.

The second lens L2 has a positive refractive power, an object-side surface S3 of the second lens L2 is a convex surface, and an image-side surface S4 of the second lens L2 is a convex surface. Both the object-side surface S3 and the image-side surface S4 of the second lens L2 are aspheric surfaces.

The third lens L3 has a positive refractive power, an object-side surface S5 of the third lens L3 is a concave surface, and an image-side surface S6 of the third lens L3 is a convex surface. Both the object-side surface S5 and the image-side surface S6 of the third lens L3 are aspheric surfaces.

The fourth lens L4 has a positive refractive power, an object-side surface S7 of the fourth lens L4 is a convex surface, and an image-side surface S8 of the fourth lens L4 is a concave surface. Both the object-side surface S7 and the image-side surface S8 of the fourth lens L4 are aspheric surfaces.

Alternatively, the camera lens assembly may further include an optical filter L5 having an object-side surface S9 and an image-side surface S10. The optical filter L5 may be a band-pass optical filter, and a passband thereof may be from about 400 nm to about 800 nm.

Alternatively, a diaphragm STO for limiting the light beam may be disposed between the first lens L1 and the second lens L2 to improve the imaging quality of the camera lens assembly.

Table 4 shows the surface type, the radius of curvature, the thickness, the material and the conic coefficient of each lens of the camera lens assembly in Embodiment 2. The radius of curvature and the thickness are shown in millimeters (mm). Table 5 shows the high-order coefficients applicable to the aspheric surfaces in Embodiment 2. The surface type of each aspheric surface may be defined by formula (1) given in the above Embodiment 1. Table 6 shows the total effective focal length f of the camera lens assembly, the effective focal lengths f1-f4 of the lenses, the total track length TTL of the camera lens assembly, the half of the diagonal length ImgH of the effective pixel area of the photosensitive element on the image plane S11 of the camera lens assembly, the half of the maximal field-of-view HFOV of the camera lens assembly and the f-number Fno of the camera lens assembly in Embodiment 2.

TABLE 4

| surface number | surface type | radius of curvature | thickness | material refractive index | abbe number | conic coefficient |
|---|---|---|---|---|---|---|
| OBJ | spherical | infinite | infinite | | | |
| S1 | aspheric | 1.9530 | 0.6305 | 1.64 | 23.5 | 1.4680 |
| S2 | aspheric | 1.9336 | 0.3086 | | | 2.8410 |
| STO | spherical | infinite | 0.0616 | | | |
| S3 | aspheric | 64.8426 | 0.8178 | 1.55 | 56.1 | −99.0000 |
| S4 | aspheric | −2.0609 | 0.2091 | | | 1.2188 |
| S5 | aspheric | −0.8946 | 0.5262 | 1.55 | 56.1 | −1.5357 |
| S6 | aspheric | −0.8970 | 0.0300 | | | −0.8891 |
| S7 | aspheric | 1.3343 | 0.8634 | 1.55 | 56.1 | −2.2480 |
| S8 | aspheric | 1.3063 | 0.6046 | | | −1.9795 |
| S9 | spherical | infinite | 0.2100 | 1.52 | 64.2 | |
| S10 | spherical | infinite | 0.3000 | | | |
| S11 | spherical | infinite | | | | |

TABLE 5

| surface number | A4 | A6 | A8 | A10 | A12 | A14 | A16 |
|---|---|---|---|---|---|---|---|
| S1 | 2.0923E−02 | 4.1200E−03 | 4.6364E−03 | 9.8093E−04 | 1.0744E−03 | 6.6915E−05 | −3.5037E−04 |
| S2 | 7.8487E−02 | −4.8900E−03 | 1.1416E−02 | −1.6811E−01 | 3.0741E−07 | 7.2758E−09 | 3.3931E−10 |
| S3 | −1.4701E−01 | 3.9852E−01 | −4.5243E+00 | 2.0586E+01 | −5.6911E+01 | 8.5980E+01 | −5.3605E+01 |
| S4 | 1.9879E−02 | −1.6655E−01 | 3.9056E−01 | −6.6033E−01 | 7.4031E−01 | −4.9948E−01 | 1.3567E−01 |

TABLE 5-continued

| surface number | A4 | A6 | A8 | A10 | A12 | A14 | A16 |
|---|---|---|---|---|---|---|---|
| S5 | 2.8083E−01 | −8.8853E−01 | 7.7995E−01 | 6.0582E−01 | −1.3916E+00 | 8.3631E−01 | −1.7365E−01 |
| S6 | −2.9066E−02 | −6.2871E−02 | −8.1163E−02 | 6.6627E−03 | 1.9177E−01 | −1.3168E−01 | 2.4524E−02 |
| S7 | −1.1243E−01 | 2.1637E−02 | −6.0704E−04 | −1.8416E−04 | −1.3564E−04 | −3.2433E−05 | −1.0134E−05 |
| S8 | −8.3959E−02 | 1.4366E−02 | −6.8340E−04 | −6.0519E−05 | −2.0099E−05 | −2.1863E−06 | 6.9599E−07 |

TABLE 6

| parameter | f (mm) | f1 (mm) | f2 (mm) | f3 (mm) | f4 (mm) |
|---|---|---|---|---|---|
| value | 2.20 | 25.73 | 3.67 | 8.01 | 11.53 |

| parameter | TTL (mm) | ImgH (mm) | HFOV (°) | Fno |
|---|---|---|---|---|
| value | 4.56 | 2.41 | 49.88 | 2.25 |

Figure 4A:
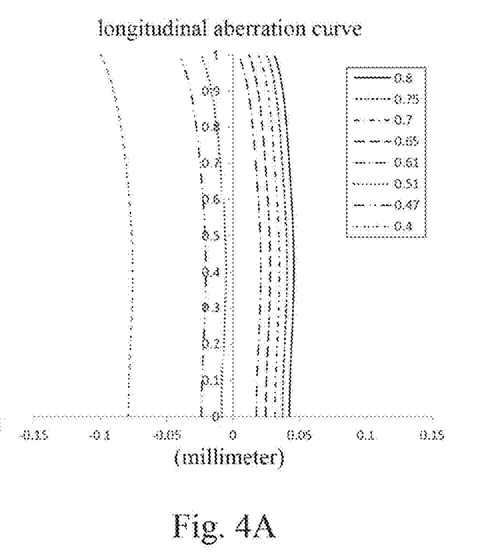
FIGS. 4A-4C respectively illustrate a longitudinal aberration curve, an astigmatic curve and a distortion curve of the camera lens assembly according to Embodiment 2.
Figure 4B:
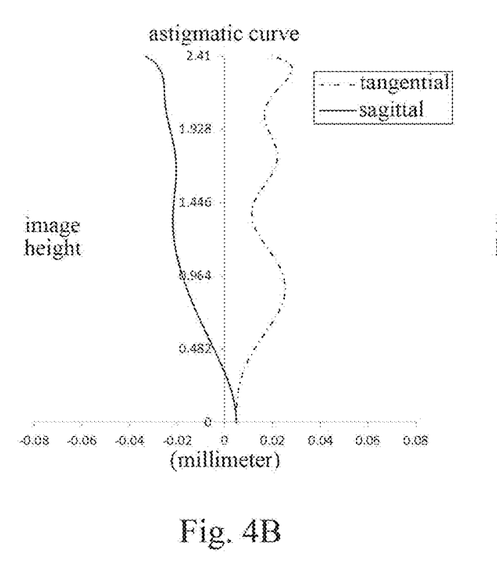
Figure 4C:
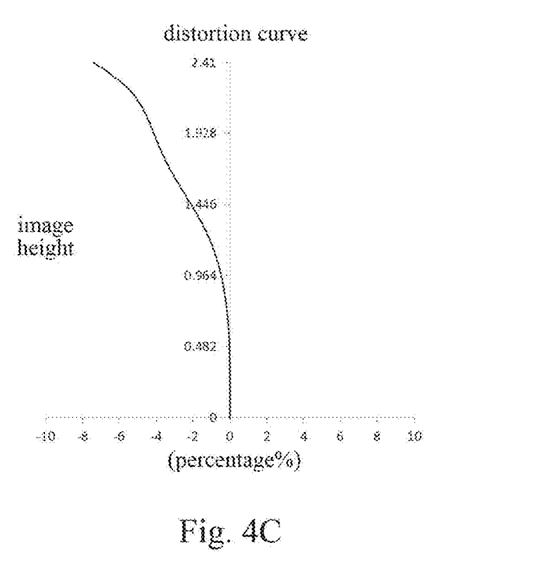

FIG. 4A shows a longitudinal aberration curve of the camera lens assembly according to Embodiment 2, representing deviations of focal points of light of different wavelengths converged after passing through the lens assembly. FIG. 4B shows the astigmatic curve of the camera lens assembly according to Embodiment 2, representing a curvature of the tangential image plane and a curvature of the sagittal image plane. FIG. 4C shows a distortion curve of the camera lens assembly according to Embodiment 2, representing amounts of distortion at different viewing angles. According to FIG. 4A to FIG. 4C, it may be seen that the camera lens assembly according to Embodiment 2 can achieve a good imaging quality.

Embodiment 3

Figure 5:
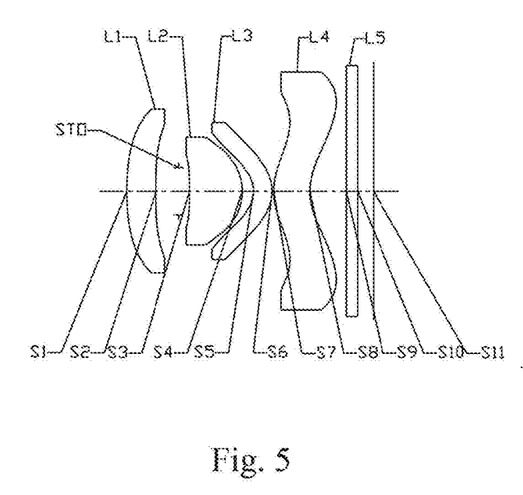
FIG. 5 illustrates a schematic structural diagram of a camera lens assembly according to Embodiment 3 of the present disclosure.

The camera lens assembly according to Embodiment 3 of the present disclosure is described below with reference to FIGS. 5-6C. FIG. 5 is a schematic structural diagram illustrating the camera lens assembly according to Embodiment 3 of the present disclosure.

As shown in FIG. 5, the camera lens assembly includes a first lens L1, a second lens L2, a third lens L3, a fourth lens L4 and an image plane S11 sequentially along an optical axis from an object side to an image side. The camera lens assembly may further include a photosensitive element disposed on the image plane S11.

The first lens L1 has a positive refractive power, an object-side surface S1 of the first lens L1 is a convex surface, and an image-side surface S2 of the first lens L1 is a concave surface. Both the object-side surface S1 and the image-side surface S2 of the first lens L1 are aspheric surfaces.

The second lens L2 has a positive refractive power, an object-side surface S3 of the second lens L2 is a concave surface, and an image-side surface S4 of the second lens L2 is a convex surface. Both the object-side surface S3 and the image-side surface S4 of the second lens L2 are aspheric surfaces.

The third lens L3 has a negative refractive power, an object-side surface S5 of the third lens L3 is a concave surface, and an image-side surface S6 of the third lens L3 is a convex surface. Both the object-side surface S5 and the image-side surface S6 of the third lens L3 are aspheric surfaces.

The fourth lens L4 has a positive refractive power, an object-side surface S7 of the fourth lens L4 is a convex surface, and an image-side surface S8 of the fourth lens L4 is a concave surface. Both the object-side surface S7 and the image-side surface S8 of the fourth lens L4 are aspheric surfaces.

Alternatively, the camera lens assembly may further include an optical filter L5 having an object-side surface S9 and an image-side surface S10. The optical filter L5 may be a band-pass optical filter, and a passband thereof may be from about 400 nm to about 800 nm.

Alternatively, a diaphragm STO for limiting the light beam may be disposed between the first lens L1 and the second lens L2 to improve the image quality of the camera lens assembly.

Table 7 shows the surface type, the radius of curvature, the thickness, the material and the conic coefficient of each lens of the camera lens assembly in Embodiment 3. The radius of curvature and the thickness are shown in millimeters (mm). Table 8 shows the high-order coefficients applicable to the aspheric mirror surfaces in Embodiment 3. The surface type of each aspheric surface may be defined by formula (1) given in the above Embodiment 1. Table 9 shows the total effective focal length f of the camera lens assembly, the effective focal lengths f1-f4 of the lenses, the total track length TTL of the camera lens assembly, the half of the diagonal length ImgH of the effective pixel area of the photosensitive element on the image plane S11 of the camera lens assembly, the half of the maximal field-of-view HFOV of the camera lens assembly and the f-number Fno of the camera lens assembly in Embodiment 3.

TABLE 7

| | | | | material | | |
|---|---|---|---|---|---|---|
| surface number | surface type | radius of curvature | thickness | refractive index | abbe number | conic coefficient |
| OBJ | spherical | infinite | infinite | | | |
| S1 | aspheric | 5.2073 | 0.5487 | 1.64 | 23.5 | 3.1233 |
| S2 | aspheric | 16.2914 | 0.4313 | | | 5.0000 |
| STO | spherical | infinite | 0.2001 | | | |
| S3 | aspheric | −13.9694 | 0.9860 | 1.55 | 56.1 | −99.0000 |
| S4 | aspheric | −1.00877 | 0.2116 | | | −0.4380 |
| S5 | aspheric | −0.5252 | 0.3459 | 1.64 | 23.5 | −1.1023 |
| S6 | aspheric | −0.7344 | 0.0300 | | | −1.1434 |
| S7 | aspheric | 1.1793 | 0.6775 | 1.55 | 56.1 | −0.7406 |
| S8 | aspheric | 1.1165 | 0.6817 | | | −0.8801 |
| S9 | spherical | infinite | 0.2100 | 1.52 | 64.2 | |
| S10 | spherical | infinite | 0.3000 | | | |
| S11 | spherical | infinite | | | | |

TABLE 8

| surface number | A4 | A6 | A8 | A10 | A12 | A14 | A16 |
|---|---|---|---|---|---|---|---|
| S1 | 3.6012E−02 | −7.7363E−03 | 1.1687E−02 | −8.9687E−03 | 2.4306E−03 | 5.4130E−04 | −2.3742E−04 |
| S2 | 8.3804E−02 | −3.3726E−02 | −2.7503E−02 | 5.2194E−02 | −1.8830E−02 | −3.7102E−03 | 2.1635E−03 |
| S3 | −1.5516E−01 | −4.3653E−02 | −5.9461E−01 | 9.6216E−01 | 1.4100E−12 | 8.2685E−13 | −2.2703E−14 |
| S4 | −2.2284E−01 | 1.8191E−01 | 2.9004E−02 | −1.6856E−01 | 9.8037E−02 | 6.2261E−10 | 1.3983E−10 |
| S5 | 7.3373E−02 | 3.8029E−04 | 1.8771E−01 | −5.5472E−02 | −1.4583E−02 | −2.2173E−02 | 6.2736E−03 |
| S6 | −5.6954E−03 | 8.3664E−02 | −6.6584E−02 | 4.0734E−02 | −5.8777E−03 | −4.1634E−03 | 5.3386E−04 |
| S7 | −2.1638E−01 | 4.2039E−02 | −1.0040E−02 | 9.9142E−04 | 8.3370E−05 | 9.2506E−06 | −5.1068E−06 |
| S8 | −1.7237E−01 | 3.4721E−02 | −4.7304E−03 | 7.4963E−05 | 6.0811E−06 | 3.4355E−06 | −2.3461E−07 |

TABLE 9

| parameter | f (mm) | f1 (mm) | f2 (mm) | f3 (mm) | f4 (mm) |
|---|---|---|---|---|---|
| value | 2.15 | 11.65 | 1.94 | −8.12 | 13.67 |

| parameter | TTL (mm) | ImgH (mm) | HFOV (°) | Fno |
|---|---|---|---|---|
| value | 4.62 | 2.41 | 50.52 | 2.25 |

Figure 6A:
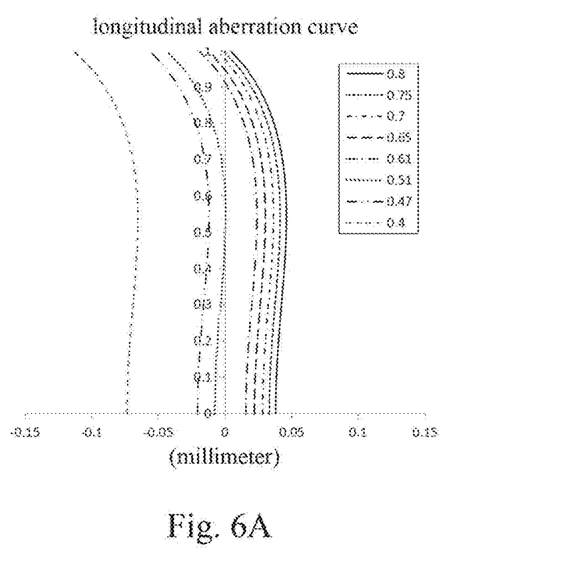
FIGS. 6A-6C respectively illustrate a longitudinal aberration curve, an astigmatic curve and a distortion curve of the camera lens assembly according to Embodiment 3.
Figure 6B:
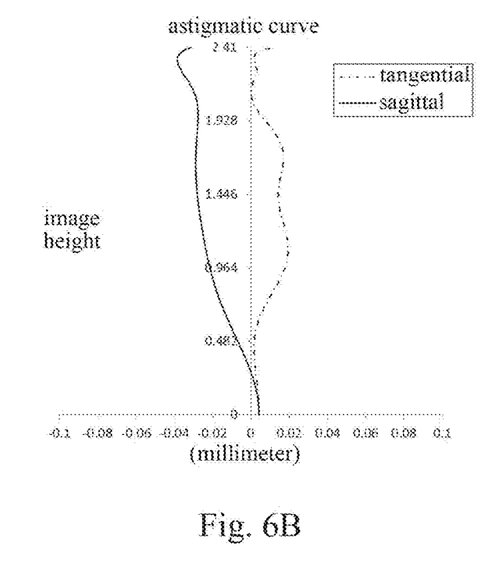
Figure 6C:
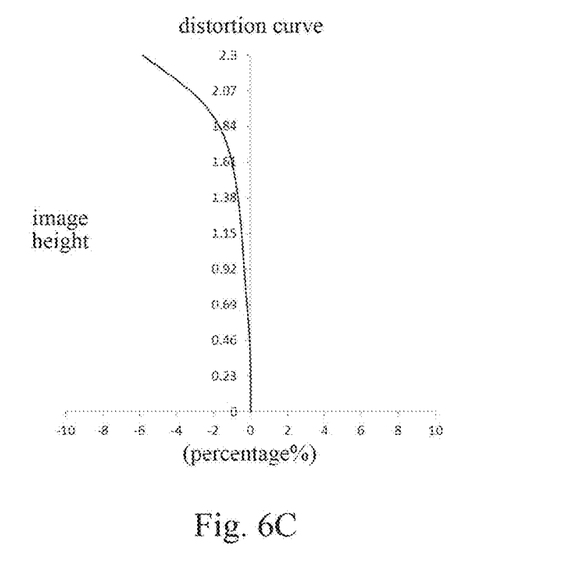

FIG. 6A shows the longitudinal aberration curve of the camera lens assembly according to Embodiment 3, representing deviations of focal points of light of different wavelengths converged after passing through the lens assembly. FIG. 6B shows the astigmatic curve of the camera lens assembly according to Embodiment 3, representing a curvature of the tangential image plane and a curvature of the sagittal image plane. FIG. 6C shows the distortion curve of the camera lens assembly according to Embodiment 3, representing amounts of distortion at different viewing angles. According to FIG. 6A to FIG. 6C, it may be seen that the camera lens assembly according to Embodiment 3 can achieve a good imaging quality.

Embodiment 4

Figure 7:
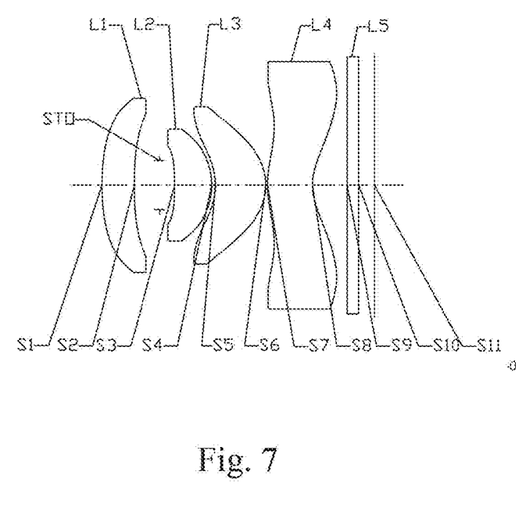
FIG. 7 illustrates a schematic structural diagram of a camera lens assembly according to Embodiment 4 of the present disclosure.

The camera lens assembly according to Embodiment 4 of the present disclosure is described below with reference to FIGS. 7-8C. FIG. 7 is a schematic structural diagram illustrating the camera lens assembly according to Embodiment 4 of the present disclosure.

As shown in FIG. 7, the camera lens assembly includes a first lens L1, a second lens L2, a third lens L3, a fourth lens L4 and an image plane S11 sequentially along an optical axis from an object side to an image side. The camera lens assembly may further include a photosensitive element disposed on the image plane S11.

The first lens L1 has a positive refractive power, an object-side surface S1 of the first lens L1 is a convex surface, and an image-side surface S2 of the first lens L1 is a concave surface. Both the object-side surface S1 and the image-side surface S2 of the first lens L1 are aspheric surfaces.

The second lens L2 has a positive refractive power, an object-side surface S3 of the second lens L2 is a concave surface, and an image-side surface S4 of the second lens L2 is a convex surface. Both the object-side surface S3 and the image-side surface S4 of the second lens L2 are aspheric surfaces.

The third lens L3 has a positive refractive power, an object-side surface S5 of the third lens L3 is a concave surface, and an image-side surface S6 of the third lens L3 is a convex surface. Both the object-side surface S5 and the image-side surface S6 of the third lens L3 are aspheric surfaces.

The fourth lens L4 has a positive refractive power, an object-side surface S7 of the fourth lens L4 is a convex surface, and an image-side surface S8 of the fourth lens L4 is a concave surface. Both the object-side surface S7 and the image-side surface S8 of the fourth lens L4 are aspheric surfaces.

Alternatively, the camera lens assembly may further include an optical filter L5 having an object-side surface S9 and an image-side surface S10. The optical filter L5 may be a band-pass optical filter, and a band-pass wavelength thereof may be about 400 nm to about 800 nm.

Alternatively, a diaphragm STO for limiting the light beam may be disposed between the first lens L1 and the second lens L2 to improve the image quality of the camera lens assembly.

Table 10 shows the surface type, the radius of curvature, the thickness, the material and the conic coefficient of each lens of the camera lens assembly in Embodiment 4. The radius of curvature and the thickness are shown in millimeters (mm). Table 11 shows the high-order coefficients applicable to the aspheric mirror surfaces in Embodiment 4. The surface type of each aspheric surface may be defined by formula (1) given in the above Embodiment 1. Table 12 shows the total effective focal length f of the camera lens assembly, the effective focal lengths f1-f4 of the lenses, the total track length TTL of the camera lens assembly, the half of the diagonal length ImgH of the effective pixel area of the photosensitive element on the image plane S11 of the camera lens assembly, the half of the maximal field-of-view HFOV of the camera lens assembly and the f-number Fno of the camera lens assembly in Embodiment 4.

TABLE 10

| surface number | surface type | radius of curvature | thickness | material refractive index | abbe number | conic coefficient |
|---|---|---|---|---|---|---|
| OBJ | spherical | infinite | infinite | | | |
| S1 | aspheric | 5.0714 | 0.5917 | 1.64 | 23.5 | 1.1713 |
| S2 | aspheric | 10.3971 | 0.4714 | | | −44.5637 |
| STO | spherical | infinite | 0.2736 | | | |
| S3 | aspheric | −6.8891 | 0.6802 | 1.55 | 56.1 | −12.1690 |
| S4 | aspheric | −1.2174 | 0.0675 | | | −0.1800 |
| S5 | aspheric | −1.1204 | 0.9239 | 1.55 | 56.1 | −1.4359 |
| S6 | aspheric | −0.9788 | 0.0300 | | | −0.9380 |
| S7 | aspheric | 1.8833 | 0.8236 | 1.64 | 23.5 | −0.2988 |
| S8 | aspheric | 0.9966 | 0.6348 | | | −0.8267 |
| S9 | spherical | infinite | 0.2100 | 1.52 | 64.2 | |
| S10 | spherical | infinite | 0.3000 | | | |
| S11 | spherical | infinite | | | | |

TABLE 11

| surface number | A4 | A6 | A8 | A10 | A12 | A14 | A16 |
|---|---|---|---|---|---|---|---|
| S1 | 4.4712E−02 | −1.3770E−02 | 1.3572E−02 | −8.2063E−03 | 2.0081E−03 | 4.1066E−04 | −1.6118E−04 |
| S2 | 8.6638E−02 | −3.5791E−02 | −2.3647E−02 | 4.5461E−02 | −9.3505E−03 | −9.1180E−03 | 3.2383E−03 |
| S3 | −1.9324E−01 | −3.5033E−02 | −8.0260E−01 | 6.7276E−01 | 2.4343E−01 | −9.0331E−10 | 6.9386E−10 |
| S4 | −1.6896E−03 | 1.1538E−01 | −1.4061E−01 | −7.9865E−02 | 6.8125E−02 | 2.1054E−03 | 8.9060E−03 |
| S5 | 9.0817E−02 | −8.9854E−02 | 1.5412E−01 | −6.3777E−02 | −1.1738E−02 | 2.0103E−04 | 1.2779E−03 |
| S6 | −5.0296E−02 | 6.6675E−02 | −7.8404E−02 | 3.8364E−02 | −7.0151E−05 | −8.2157E−04 | −6.7186E−04 |
| S7 | −2.0157E−01 | 3.8505E−02 | 1.8979E−02 | −2.0625E−02 | 7.8099E−03 | −1.3396E−03 | 8.3693E−05 |
| S8 | −3.5377E−01 | 1.9316E−01 | −9.1421E−02 | 3.0062E−02 | −6.5758E−03 | 8.3495E−04 | −4.5960E−05 |

TABLE 12

| parameter | f (mm) | f1 (mm) | f2 (mm) | f3 (mm) | f4 (mm) |
|---|---|---|---|---|---|
| value | 2.20 | 14.72 | 2.60 | 4.29 | −5.16 |
| parameter | TTL (mm) | ImgH (mm) | HFOV (°) | Fno | |
| value | 5.01 | 2.41 | 49.96 | 2.25 | |

Figure 8A:
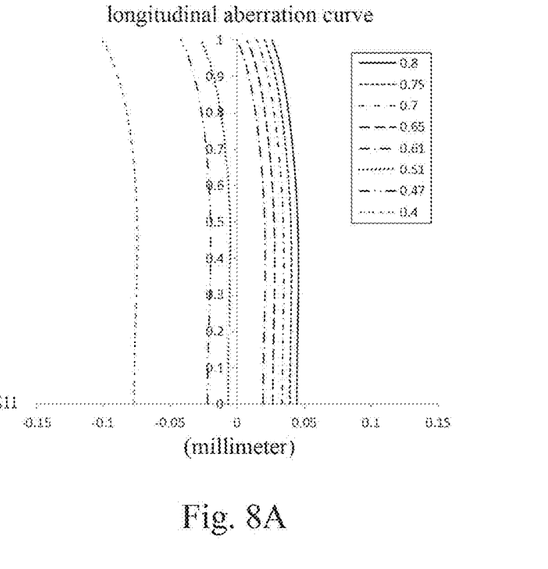
FIGS. 8A-8C respectively illustrate a longitudinal aberration curve, an astigmatic curve and a distortion curve of the camera lens assembly according to Embodiment 4.
Figure 8B:
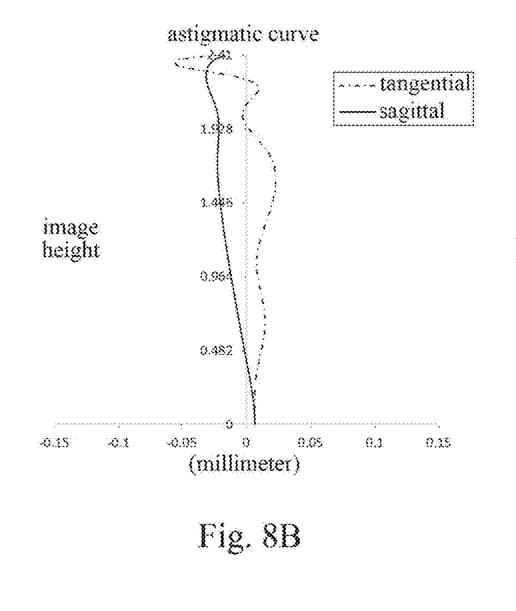
Figure 8C:
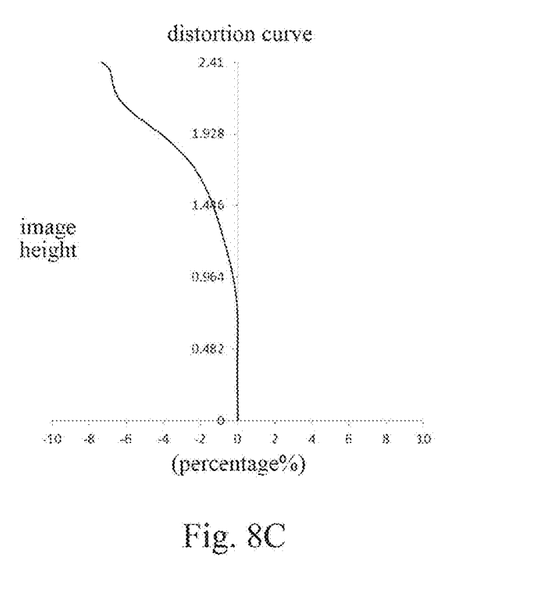

FIG. 8A shows the longitudinal aberration curve of the camera lens assembly according to Embodiment 4, representing deviations of focal points of light of different wavelengths converged after passing through the lens assembly. FIG. 8B shows the astigmatic curve of the camera lens assembly according to Embodiment 4, representing a curvature of the tangential image plane and a curvature of the sagittal image plane. FIG. 8C shows the distortion curve of the camera lens assembly according to Embodiment 4, representing amounts of distortion at different viewing angles. According to FIG. 8A to FIG. 8C, it may be seen that the camera lens assembly according to Embodiment 4 can achieve a good imaging quality.

To sum up, Embodiment 1 to Embodiment 4 satisfy the relationships shown in Table 13 below.

TABLE 13

| | Embodiment | | | |
|---|---|---|---|---|
| Conditional Formula | 1 | 2 | 3 | 4 |
| ImgH/f | 1.13 | 1.10 | 1.12 | 1.10 |
| f1/f2 | 5.97 | 7.00 | 6.01 | 5.66 |
| R5/R6 | 0.76 | 1.00 | 0.72 | 1.14 |
| CT2/TTL | 0.15 | 0.18 | 0.21 | 0.14 |
| (T12*10)/TTL | 1.10 | 0.81 | 1.37 | 1.49 |
| ET4/CT4 | 1.09 | 1.08 | 1.09 | 1.36 |
| DT12/DT22 | 0.99 | 0.78 | 1.24 | 1.27 |
| DT11/DT32 | 1.00 | 1.02 | 1.20 | 1.11 |
| SAG42/CT4 | 0.58 | 0.32 | 0.29 | 0.38 |

The present disclosure further provides a camera device, having an electronic photosensitive element that may be a photosensitive charge-coupled device (CCD) or a complementary metal-oxide semiconductor element (CMOS). The camera device may be an independent camera device such as a digital camera, or may be a camera module integrated in a mobile electronic device such as a mobile phone. The camera device is equipped with the camera lens assembly described above.

The foregoing is only a description of the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present disclosure with (but not limited to) technical features with similar functions.

What is claimed is:

1. A camera lens assembly comprising, sequentially along an optical axis from an object side to an image side, a first lens, a second lens, a third lens and a fourth lens, the lenses having refractive powers,
    wherein both the first lens and the second lens have positive refractive powers; and
    an object-side surface of the third lens and an image-side surface of the fourth lens are both concave surfaces;
    wherein, half of a diagonal length ImgH of an effective pixel area on an image plane of the camera lens assembly and a total effective focal length f of the camera lens assembly satisfy: ImgH/f>1; and
    wherein, an effective focal length f1 of the first lens and an effective focal length f2 of the second lens satisfy: 3<f1/f2≤7.

2. The camera lens assembly according to claim 1, wherein a radius of curvature R5 of the object-side surface of the third lens and a radius of curvature R6 of an image-side surface of the third lens satisfy: 0.7<R5/R6<1.2.

3. The camera lens assembly according to claim 1, wherein the camera lens assembly further comprises a diaphragm disposed between the first lens and the second lens.

4. The camera lens assembly according to claim 3, wherein an object-side surface of the first lens is a convex surface, and an image-side surface of the second lens is a convex surface.

5. The camera lens assembly according to claim 4, wherein a spacing distance T12 between the first lens and the second lens on the optical axis and a distance TTL on the optical axis from a center of the object-side surface of the first lens to the image plane of the camera lens assembly satisfy: 0.8<(T12*10)/TTL<1.5.

6. The camera lens assembly according to claim 4, wherein an effective radius DT12 of an image-side surface of the first lens and an effective radius DT22 of the image-side surface of the second lens satisfy: 0.7<DT12/DT22<1.3.

7. The camera lens assembly according to claim 4, wherein an effective radius DT11 of the object-side surface of the first lens and an effective radius DT32 of an image-side surface of the third lens satisfy: 0.9<DT11/DT32<1.3.

8. The camera lens assembly according to claim 1, wherein a center thickness CT2 of the second lens on the optical axis and a distance TTL on the optical axis from a center of an object-side surface of the first lens to the image plane of the camera lens assembly satisfy: $0.1<CT2/TTL<0.22$.

9. The camera lens assembly according to claim 1, wherein a distance SAG42 from an intersection point of the image-side surface of the fourth lens and the optical axis to a vertex of an effective radius of the image-side surface of the fourth lens on the optical axis and a center thickness CT4 of the fourth lens on the optical axis satisfy: $0.2<SAG42/CT4<0.6$.

10. A camera lens assembly comprising, sequentially along an optical axis from an object side to an image side, a first lens, a second lens, a third lens and a fourth lens, the lenses having refractive powers,
- wherein at least one of the first lens and the second lens has a positive refractive power;
- an object-side surface of the third lens and an image-side surface of the fourth lens are both concave surfaces; and
- wherein, half of a diagonal length ImgH of an effective pixel area on an image plane of the camera lens assembly and a total effective focal length f of the camera lens assembly satisfy: $ImgH/f>1$, and
- wherein the camera lens assembly further comprises a band-pass optical filter disposed between the fourth lens and the image plane of the camera lens assembly, and a passband of the band-pass optical filter is from 400 nm to 800 nm.

11. A camera lens assembly comprising, sequentially along an optical axis from an object side to an image side, a first lens, a second lens, a third lens and a fourth lens,
- wherein both the first lens and the second lens have positive refractive powers;
- the third lens has a positive refractive power or a negative refractive power, and an object-side surface of the third lens is a concave surface;
- the fourth lens has a positive refractive power or a negative refractive power, and an image-side surface of the fourth lens is a concave surface; and
- an edge thickness ET4 of the fourth lens and a center thickness CT4 of the fourth lens on the optical axis satisfy: $1<ET4/CT4<1.5$.

12. The camera lens assembly according to claim 11, wherein an object-side surface of the first lens is a convex surface, and an image-side surface of the second lens is a convex surface; and
- the camera lens assembly further comprises a diaphragm disposed between the first lens and the second lens.

13. The camera lens assembly according to claim 12, wherein an effective focal length f1 of the first lens and an effective focal length f2 of the second lens satisfy: $3<f1/f2\leq7$.

14. The camera lens assembly according to claim 11, wherein a radius of curvature R5 of the object-side surface of the third lens and a radius of curvature R6 of an image-side surface of the third lens satisfy: $0.7<R5/R6<1.2$.

15. The camera lens assembly according to claim 11, wherein a center thickness CT2 of the second lens on the optical axis and a distance TTL on the optical axis from a center of an object-side surface of the first lens to an image plane of the camera lens assembly satisfy: $0.1<CT2/TTL<0.22$.

16. The camera lens assembly according to any one of claim 11, wherein half of a diagonal length ImgH of an effective pixel area on an image plane of the camera lens assembly and a total effective focal length f of the camera lens assembly satisfy: $ImgH/f>1$.

17. The camera lens assembly according to claim 11, wherein a spacing distance T12 between the first lens and the second lens on the optical axis and a distance TTL on the optical axis from a center of the object-side surface of the first lens to an image plane of the camera lens assembly satisfy: $0.8<(T12*10)/TTL<1.5$.

18. The camera lens assembly according to claim 17, wherein an effective radius DT11 of the object-side surface of the first lens and an effective radius DT32 of an image-side surface of the third lens satisfy: $0.9<DT11/DT32<1.3$.

19. The camera lens assembly according to claim 17, wherein a distance SAG42 from an intersection point of the image-side surface of the fourth lens and the optical axis to a vertex of an effective radius of the image-side surface of the fourth lens on the optical axis and the center thickness CT4 of the fourth lens on the optical axis satisfy: $0.2<SAG42/CT4<0.6$.

* * * * *